(12) United States Patent
Linam et al.

(10) Patent No.: US 6,658,599 B1
(45) Date of Patent: Dec. 2, 2003

(54) METHOD FOR RECOVERING FROM A MACHINE CHECK INTERRUPT DURING RUNTIME

(75) Inventors: Stephen Dale Linam, Austin, TX (US); Michael Anthony Perez, Cedar Park, TX (US); Louis Gabriel Rodriguez, Austin, TX (US); Mark Walz Wenning, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 579 days.

(21) Appl. No.: 09/599,182

(22) Filed: Jun. 22, 2000

(51) Int. Cl.[7] ................................................. G06F 11/00
(52) U.S. Cl. ........................................... 714/25; 714/44
(58) Field of Search .............................. 714/1, 2, 7, 15, 714/24, 25, 44

(56) References Cited

U.S. PATENT DOCUMENTS

| | | | | |
|---|---|---|---|---|
| 5,586,250 A | * | 12/1996 | Carbonneau et al. ......... | 714/44 |
| 5,815,647 A | * | 9/1998 | Buckland et al. ............... | 714/3 |
| 5,864,653 A | * | 1/1999 | Tavallaei et al. ................ | 714/2 |
| 5,889,965 A | * | 3/1999 | Wallach et al. ............. | 710/302 |

* cited by examiner

Primary Examiner—Robert Beausoliel
Assistant Examiner—Tim M. Bonura
(74) Attorney, Agent, or Firm—Duke W. Yee; Mark E. McBurney; Lisa L. B. Yociss

(57) ABSTRACT

A method, system, and apparatus for managing a failed input/output adapter within a data processing system is provided. In one embodiment, an operating system handler receives an indication that one of a plurality of input/output adapters has failed. The operating system handler consults an error log to determine which input/output adapter has failed. Once the bad input/output adapter has been determined, the operating system handler disables the bad input/output adapter and deallocates any processes bound for the bad input/output adapter without powering down the data processing system. A user is then notified of the bad input/output adapter so that the bad input/output adapter can be replaced. The input/output adapter may be replaced without powering down the data processing system. Once the bad input/output adapter has been replace, the new input/output adapter is enabled.

36 Claims, 4 Drawing Sheets

FIG. 3

ERROR LOG
300

```
LABEL: MACHINE_CHECK_CHRP
IDENTIFIER: 56CDC3C8

Date/Time:    Wed Apr 12 17:08:59
Sequence Number: 3326
Machine Id:    000B519D4C00
Node Id:   176net101
Class: H
Type: PERM
Resource Name: sysplanar0
Resource Class: planar
Resource Type: sysplanar_rspc
Location:    00-00

Description
MACHINE CHECK

Probable Causes
UNDETERMINED

Failure Causes
PROCESSOR MACHINE CHECK

Recommended Actions
    RUN SYSTEM DIAGNOSTICS.

Detail Data
MACHINE STATUS SAVE/RESTORE REGISTER 0
0000 0000 07F5 8B60
MACHINE STATUS SAVE/RESTORE REGISTER 1
0000 0000 0000 1010
PROBLEM DATA
0394 2203 0000 019A C600 9300 2209 0000 2000 0412 2004 4058 008B 1014 0201 0000
0000 0000 00FF 0000 0000 0000 0000 0000 4942 4D00 5530 2E32 2D50 312D 4931 0000
0010 4646 0406 0000 0000 0000 0000 0000 0010 4646 0406 0010 0000 0000 0000 0000
000C 4646 0406 0028 0000 0800 0010 4646 0406 0020 0000 0000 0000 0000 0010 4646
0406 0068 0000 0000 0000 0000 0010 4646 0406 0070 0000 0000 0000 0000 0010 4646
0406 0100 0000 0040 0000 0000 0010 4646 0406 0110 0000 0000 0000 0000 000C 4646
0406 0128 0000 0800 0010 4646 0406 0120 0000 0000 0000 0000 0010 4646 0406 0168
0000 0000 0000 0000 0010 4646 0406 0170 0000 0000 0000 0000 000C 4646 0406 0180
0000 0000 000C 4646 0406 0130 2001 0000 000C 4646 0406 0140 1001 0000 000C 4646
0406 0181 0000 0000 000C 4646 0406 0182 0300 9710 000C 4646 0406 0183 0000 0000
000C 4646 0406 0184 031B 35B4 000C 4646 0406 0185 F740 0800 000C 4646 0406 0130
2001 0000 000C 4646 0406 0140 1001 0000 000C 4646 0406 0180 0000 0000 000C 4646
0F01 0001 4420 0147 000C 4646 0F01 0006 F843 4100 000C 4646 0F01 0007 0000 A420
0002 0000 0000 0000 0000 0000 0000 0000 0000 0000 0000 0000 0000 0000 0000 0000
0000 0000 0000 0000 0000 0000 0000 0000 0000 0000 0000 0000 0000 0000 0000 0000
```

METHOD FOR RECOVERING FROM A MACHINE CHECK INTERRUPT DURING RUNTIME

BACKGROUND OF THE INVENTION

1. Technical Field

The present invention relates generally to the field of computer architecture and, more specifically, to methods and systems for managing machine check interrupts during runtime.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set-of the platform's resources. These platform allocable resources include one or more architecturally distinct processors with their interrupt management area, regions of system memory, and input/output (I/O) adapter bus slots. The partition's resources are represented by its own open firmware device tree to the OS image.

Each distinct OS or image of an OS running within the platform is protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

Currently, in both LPAR systems and non-partitioned systems, when a machine check occurs due to a bad I/O adapter in the system, data about the condition causing the machine check is presented to the operating system in the form of an error log entry. The operating system then performs a complete shutdown of the system. The user must then replace the bad I/O adapter and then reboot the system. Such a requirement may not be terribly problematic for users with a simple configuration in which a reboot is relatively quick or for users in which having the system available at all times is not critical. However, for other users with complex configurations, such as, for example, multiple racks of serial storage architecture (SSA) or networked systems, a considerable amount of time will be spent rebooting the system just to replace one bad I/O adapter. Such expenditure of time may be very costly for those users. For example, if the system is a web server critical for taking internet sales orders for products, such as, for example, books or compact disks (CDs), each minute of time that the system is shut down to replace a bad I/O adapter may result in many thousands of dollars in lost sales.

Therefore, a method and system for replacing bad I/O adapters without the need for powering down or rebooting the system would be desirable.

SUMMARY OF THE INVENTION

The present invention provides a method, system, and apparatus for managing a failed input/output adapter within a data processing system. In one embodiment, an operating system handler receives an indication that one of a plurality of input/output adapters has failed. The operating system handler consults an error log to determine which input/output adapter has failed. Once the bad input/output adapter has been determined, the operating system handler disables the bad input/output adapter and deallocates any processes bound for the bad input/output adapter without powering down the data processing system. A user is then notified of the bad input/output adapter so that the bad input/output adapter can be replaced. The input/output adapter may be replaced without powering down the data processing system. Once the bad input/output adapter has been replaced, the new input/output adapter is enabled.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts an exemplary table depicting possible contents and information contained within an error log in accordance with the present invention;

DETAILED DESCRIPTION OF THE PREFERRED EMBODIMENT

Figure 1:
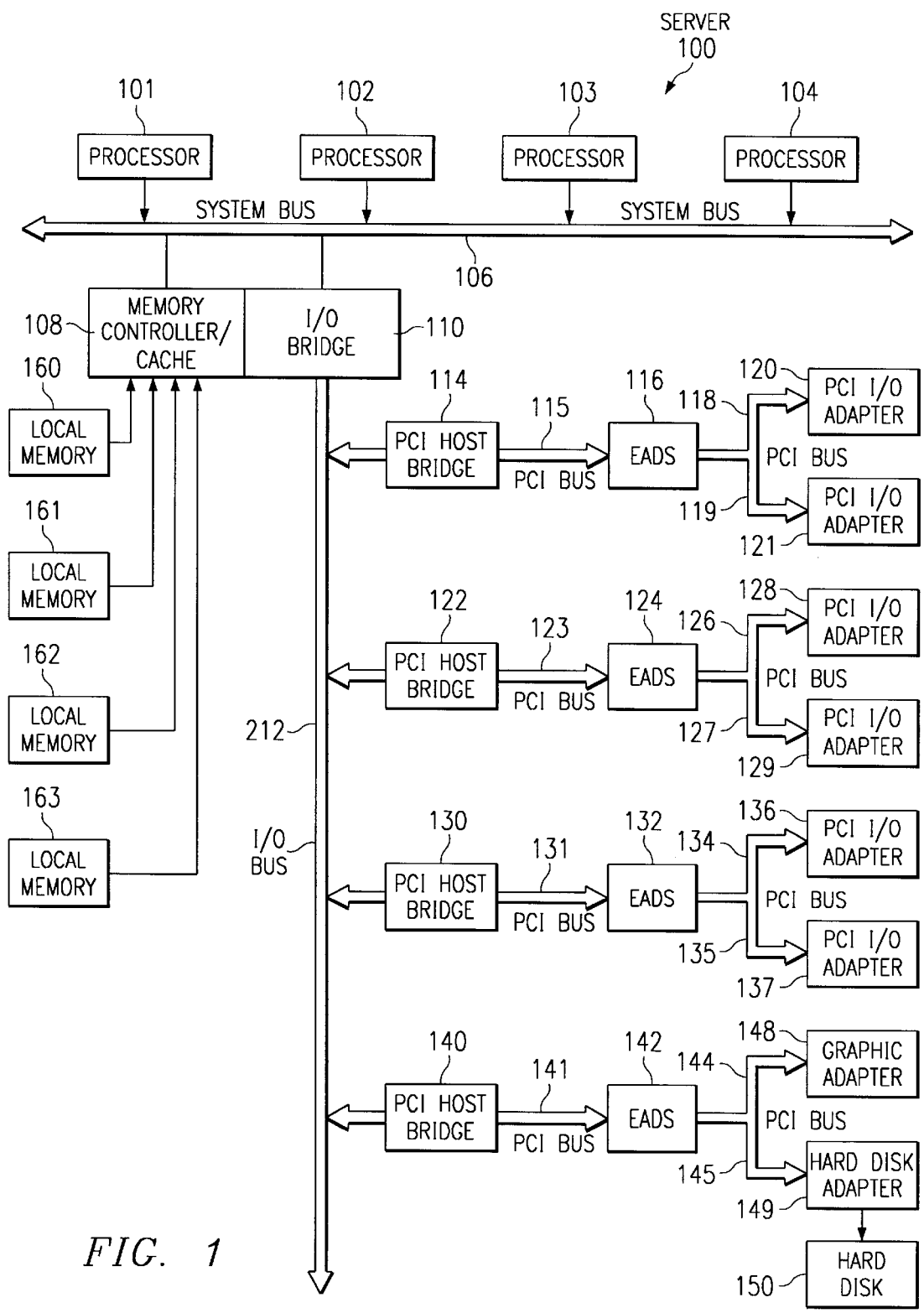
FIG. 1 depicts a block diagram of a data processing system in accordance with the present invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of theses multiple operating systems may have any number of software programs executing within in it. Data processing system 100 is logically partitioned such that different I/O adapters 120–121, 128–129, 136–137, and 146–147 may be assigned to different logical partitions.

Thus, for example, suppose data processing system 100 is divided into three logical partitions, P1, P2, and P3. Each of I/O adapters 120–121, 128–129, and 136–137, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 137 may be assigned to partition P2; and processor 104, memories 162–163, and I/O adapters 136 and 146–147 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000™ operating system may be operating within logical partition P1. Windows 2000 is a product and trademark of Microsoft Corporation of Redmond, WA.

Peripheral component interconnect (PCI) Host bridge 114 connected to I/O bus 112 provides an interface to primary PCI local bus 115. A number of Input/Output adapters 120–121 may be connected to primary PCI bus 115 via respective secondary PCI buses 118–119 and external address strobe (EADS) 116. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

EADS 116, 124, 132, and 142 are multifunction PCI-PCI bridges that support hot plugging of I/O adapters on the secondary buses 118–119, 126–127, 134–135, and 144–145. Hot plugging allows the addition, removal, and replacement of I/O adapters 120–121, 128–129, 136–137, and 148–149 during runtime. Each adapter 120–121, 128–129, 136–137, and 148–149 has its own secondary PCI bus 118–119, 126–127, 134–135, and 144–145, which makes hot plugging possible. Each EADS 116, 124, 132, and 142 may be configured to function as a bridge from a primary bus 115, 123, 131, and 141 to up to eight secondary hot plug PCI busses 118–119, 126–127, 134–135, and 144–145. In the depicted embodiment primary PCI buses 115, 123, 131, and 141 are 64-bits wide, 3.3 volt (V) tolerant and run at between 16–66 MHz. Secondary PCI buses 118–119, 126–127, 134–135, and 144–145 are 32-bits wide, wherein each pair of secondary PCI buses 118–119, 126–127, 134–135, and 144–145 may be combined into a 64-bit wide bus.

Additional PCI host bridges 122 and 130 provide interfaces for additional primary PCI buses 123 and 131. Each of additional primary PCI buses 123 and 131 are connected to a respective one of EADS 124 and 132. Each of EADS 124 and 132 is connected to a plurality of secondary PCI buses 126–127 and 134–135 as depicted in FIG. 1. Secondary PCI buses 126–127 and 134–135 provide a connection between a plurality of PCI I/O adapters 128–129 and 136–137 to EADS 124 and 132. Thus, additional I/O devices, such as, for example, modems or network adapters may be supported through each of PCI I/O adapters 128–129 and 136–137. In this manner, data processing system 100 allows connections to multiple network computers.

A memory mapped graphics adapter 148 and hard disk 150 may also be connected to I/O bus 112 via EADS 142 and PCI Host Bridge 140. EADS 142 is connected to PCI Host Bridge 140 through primary PCI bus 141. Graphics adapter 148 is connected to EADS 142 through secondary PCI bus 144 and hard disk adapter 149, through which hard disk 150 is connected to data processing system 100, is connected to EADS 142 through secondary PCI bus 145. Hard disk 150 may be logically partitioned between various partitions without the need for additional hard disks. However, additional hard disks may be utilized if desired.

Those of ordinary skill in the art will appreciate that the hardware depicted in FIG. 1 may vary. For example, other peripheral devices, such as optical disk drives and the like, also may be used in addition to or in place of the hardware depicted. Furthermore, the present invention is not limited to implementation on a multiprocessor logically partitioned system, but may also be implemented on other types of data processing systems, such as, for example, a single processor system running a single image of an operating system, such as a typical personal computer. The depicted example is not meant to imply architectural limitations with respect to the present invention.

Figure 2:
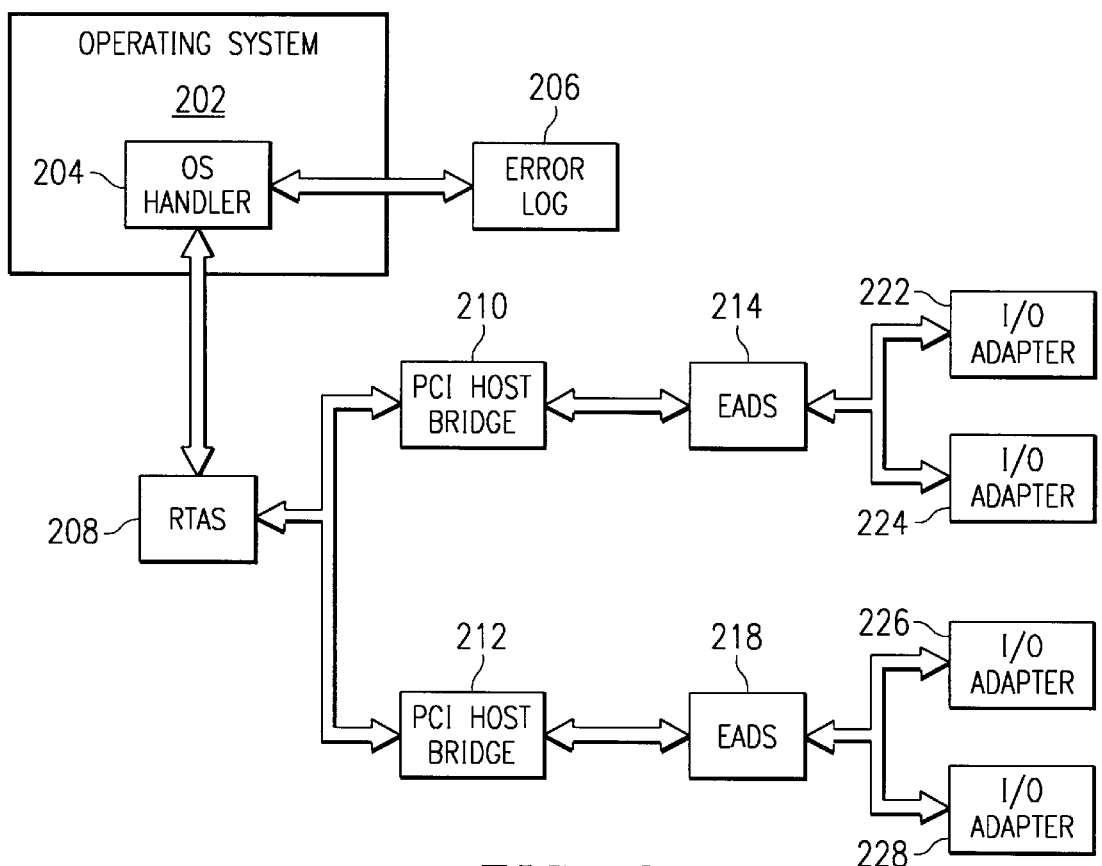
FIG. 2 depicts a block diagram of a system for handling machine check interrupts without the necessity of powering down the system is depicted in accordance with the present invention.

With reference now to FIG. 2, a block diagram of a system for handling machine check interrupts without the necessity of powering down the system is depicted in accordance with the present invention. A machine check interrupt is an interrupt that operating systems, such as, for example, AIX, use when the data processing system detects that an adapter has failed. A catastrophic error that will always have AIX report a machine check is a system error (SERR). A SERR may be caused for various reasons such as, for example, parity errors. Parity errors may include data parity error during a special cycle and address parity errors. A SERR may also be cause by other critical error other than parity, such as, for example, a master abort error. In prior art systems, a machine check interrupt resulted in a system shutdown. However, the present invention, provides a mechanism for handling the machine check error and replacing the bad I/O adapter without resort to shutting down the data processing system.

An operating system (OS) 202 executing within a data processing system, such as, for example, data processing system 100 in FIG. 1, includes an OS interrupt handler 204 for handling machine check interrupts occurring within the data processing system. OS 202 may be, for example, AIX. A run-time abstraction service (RTAS) 208 provides a mechanism for receiving machine check interrupts from PCI Host Bridges 210–212. In the present example, RTAS 208 is implemented within firmware. Firmware is software stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

The machine check interrupt indicates that one of I/O adapters 214–220, connected to PCI Host Bridges 210–212 is bad (i.e. has ceased to perform correctly). OS handler 204 makes calls to RTAS 208 to determine whether a machine check has occurred and RTAS 208 presents the machine check interrupt data to OS handler 204 in the form of an error log entry. An example of an error log entry is:

BFE4C025 0607120300 P H sysplanar0 MACHINE_CHECK_CHRP

Such an error log entry indicates to OS 202 that machine check interrupt has been received indicating that an I/O adapter 222–228 identified by the ID "BFE4C025" has failed. OS handler 204 than posts data to error log 206 based on the information received from RTAS 208. Error log 300 depicted in FIG. 3 is an exemplary table, in accordance with the present invention, depicting possible contents and information contained within error log 206.

The contents of error log 206 indicates which of I/O. adapters 214–220 is bad, if RTAS 208 is able to determine such information. Otherwise, the entry in error log 206 merely reflects the fact that a machine check interrupt has occurred within the data processing system without indicating which of I/O Adapters 214–220 caused the machine check interrupt.

Once OS handler 204 has written to error log 206, OS 202 analyzes error log 206 to determine the identity of the failing I/O adapter 222–228. For example, an AIX operating system may analyze error log 206 using the "DIAG" command and produce the following result:

| A03-030: | I/O bus time-out, | access, or other error |
|---|---|---|
| n/a | FRU:n/a | U0.1-P1-I3 |

The data structure of the form "UO.X" indicates by "X" the drawer number of the bad adapter. Thus, in the example of above, "U0.1"(X=1), indicates that the drawer number of the bad adapter is "1." The data structure of the form "IY" indicates the slot number of the bad adapter where "Y", is the slot number. Thus, in the example above, the bad adapter is in slot 3, drawer 1.

If OS interrupt handler 204 is unable to determine the one of I/O adapters 214–220 that failed, then the data processing system is powered off. If, however, OS interrupt handler 204 is able to determine the one of I/O adapters 213–220 that failed, then operating system 202 will call RTAS 208 hot plug to disable the failing I/O adapter 214–220 and deallocate any processes bound to the failing one of I/O adapters 214–220. RTAS writes directly to the EADS register of the one of EADS 214 and 218 corresponding to the bad one of I/O adapters 222–228 to turn off the power to the slot containing the bad one of I/O adapters 222–228.

Once the failing one of I/O adapters 214–220 is disabled, an urgent sysplanar message can be sent to a user notifying the user of the bad adapter, such as, for example, via a page, a message to a video display terminal, and/or blinking lights on the slot containing the bad adapter. An urgent sysplanar is a message that the system will output to an output device, typically at predefined time intervals, so that a user may be alerted the adapter is no longer working.

The user will then be able to replace the bad adapter, re-enable the adapter, using the hotplug feature provided by OS 202, RTAS 208, and EADS 214 and 218 working in concert. The user may then reconfigure the adapter once replaced.

Those of ordinary skill in the art will appreciate that the hardware and software depicted in FIG. 2 may vary. For example, more or fewer I/O adapters may be used than those depicted in FIG. 2. The depicted example is not meant to imply architectural limitations with respect to the present invention.

Figure 4:
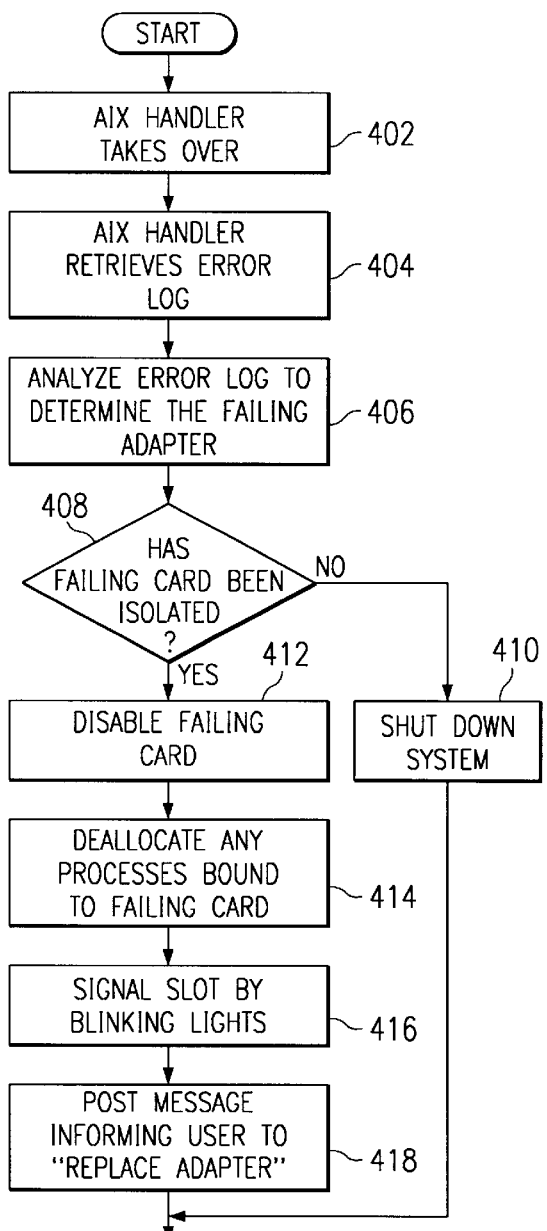
FIG. 4 depicts a flowchart illustrating an exemplary process of replacing a bad I/O adapter without powering down the system in accordance with the present invention.

With reference now to FIG. 4, a flowchart illustrating an exemplary process of isolating a bad I/O adapter without powering down the system (i.e. a hotplug operation) is depicted in accordance with the present invention. Once the system is running and a machine check occurs indicating a bad I/O adapter, an AIX handler takes over control of the system (step 402). The AIX handler may be implemented as OS handler 204 in FIG. 2. The AIX handler retrieves the error log to which the RTAS entered the machine check (step 404) and analyzes the error log to determine the failing adapter (step 406). The AIX handler then determines whether the failing card has been isolated (step 408).

If the failing card has not been isolated by the RTAS, then the AIX handler causes the system to be shut down (step 410). If the failing card has been isolated and determined, then disable the failing card by, for example, a call to RTAS-hot plug (step 412). The AIX also deallocates any processes bound to the failing I/O adapter (step 414). Once the failing I/O adapter has been successfully disabled, signal the appropriate expansion slot with, for example, blinking lights to indicate which I/O adapter has failed (step 416). The AIX then posts a message informing a user to replace the bad adapter (step 418). The message may be posted, for example, to a video display terminal or by page to an appropriate person assigned to maintaining the system.

Figure 5:
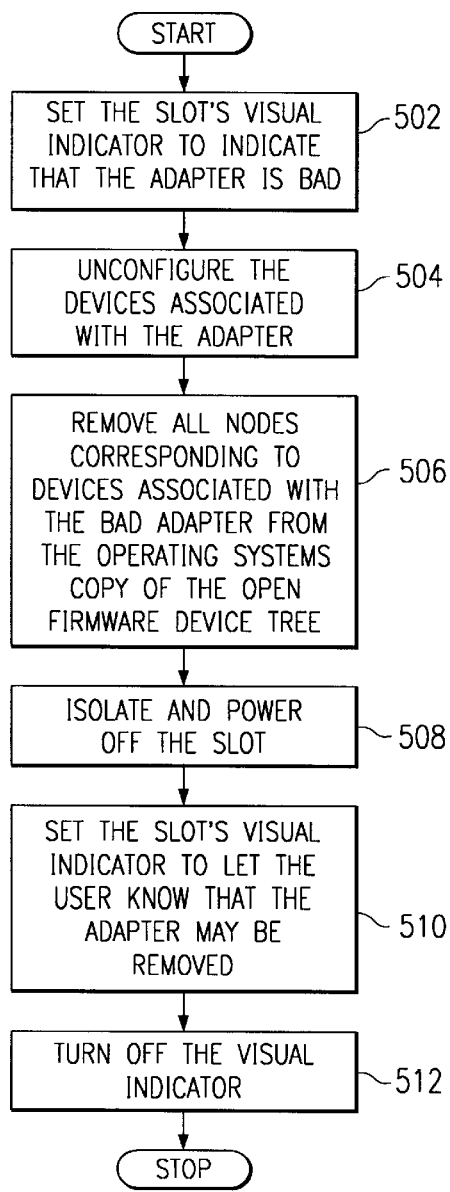
FIG. 5 depicts a flowchart illustrating an exemplary method of removing a bad I/O adapter via hotplug in accordance with the present invention.

With reference now to FIG. 5, a flowchart illustrating an exemplary method of removing a bad I/O adapter via hotplug is depicted in accordance with the present invention. Once an adapter has been identified as bad, the RTAS, such as, for example, RTAS 208 in FIG. 2, sets the visual indicator of the expansion slot in which the bad I/O adapter is located to alert a user that the expansion slot has been identified as containing a bad I/O adapter (step 502). The visual indicator may be, for example, blinking lights on the expansion slot. The OS, such as OS 202 in FIG. 2, unconfigures the devices associated with the bad I/O adapter (step 504). This process may be performed, for example, by using the AIX command "rmdev".

Once the devices associated with the bad I/O adapter have been unconfigured, all nodes corresponding to devices associated with the bad I/O adapter are removed from the OS copy of the open firmware device tree provided by RTAS (step 506). RTAS then isolates and turns the power off to the expansion slot containing the bad I/O adapter (step 508). RTAS then sets the affected expansion slot's visual indicator to a condition that informs a user that the I/O adapter connected to that expansion slot may be removed (step 510). Once, the bad I/O adapter has been removed, the RTAS turns off the visual indicator to the affected expansion slot (step 512) indicating that the user has removed the correct I/O adapter. The user may then insert a replacement I/O adapter and reconfigure the system to utilize the new I/O adapter. Thus, a bad I/O adapter may be removed and replaced during runtime (i.e. without shutting down the system).

Figure 6:
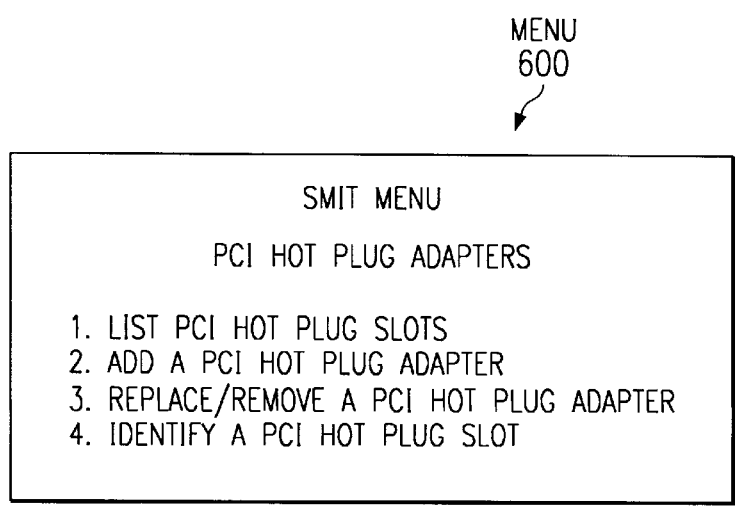
FIG. 6 depicts an example menu allowing a user to initiate a hotplug procedure for removing and replacing a bad I/O adapter in accordance with the present invention.

Once the user has been notified of the bad I/O adapter, the process of removing and replacing the bad I/O adapter may be initiated through a menu, such as, for example, an AIX System Management Interface Tool (SMIT) menu. An example of a SMIT menu is depicted in FIG. 6. Menu 600 provides a user with a list of hotplug services performed by the data processing system, such as data processing system 100 in FIG. 1. In menu 600, a user may select item 3 to place the bad I/O adapter in a condition in which the user can remove and replace the bad I/O adapter within the data processing system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a failed input/output adapter within a logically partitioned data processing system, the method comprising:

coupling a plurality of adapters to a bridge, said bridge being couple to and I/O bus, said plurality of adapters communicating with said I/O bus utilizing said bridge;

receiving and indication that an adapter within said a plurality of adapters has failed;

attempting to identify said adapter as a failed adapter; and responsive to successfully identifying said adapter device, disabling said adapter without powering down the data processing system and without disabling remaining ones of said plurality of adapters, wherein said remaining ones of said plurality of adapters remain enabled, operational, and continue to communicate with said I/O bus utilizing said bridge after said failed adapter has been disabled.

2. The method as recited in claim 1, further comprising:
   sending a message to a user indicating that one of the plurality of adapters has failed and including the identity of the failed adapter.

3. The method as recited in claim 2, wherein the step of sending a message comprises activating blinking lights on an expansion slot containing said failed adapter device to indicate to a user which one of the plurality of adapters is the failed adapter.

4. The method as recited in claim 2, wherein the step of sending a message comprises paging a user.

5. The method as recited in claim 2, wherein the step of sending a message comprises displaying a message on a video display indicating that one of the plurality of adapters has failed and including the identity of the failed adapter.

6. The method as recited in claim 1, further comprising:
   responsive to an indication that the failed adapter has been replaced with a new adapter, enabling the new adapter.

7. The method as recited in claim 1, further comprising:
   deallocating any processes bound for the failed adapter.

8. The method as recited in claim 1, further comprising:
   responsive to a failure to identify the failed adapter, powering down the data processing system.

9. The method as recited in claim 1, wherein the step of attempting to determine the identity comprises consulting an error log table.

10. A computer program product in a computer readable media for use in a logically partitioned data processing system for managing a failed adapter within the data processing system, the computer program product comprising:

a plurality of adapters being coupled to a bridge, said bridge being coupled to an I/O bus, said plurality of adapters communicating with said I/O bus utilizing said bridge;

first instructions for receiving and indication that an adapter with said plurality of adapters hardware devices has failed;

second instructions for attempting to identify the adapter as a failed adapter; and third instructions, responsive to successfully identifying the failed adapter, for disabling the failed adapter without powering down the data processing system and without disabling remaining ones of said plurality of adapters, wherein said remaining ones of said plurality of adapters remain enabled, operational, and continue to communicate with said I/O bus utilizing said bridge after said failed adapter has been disabled.

11. The computer program as recited in claim 10, further comprising:
    forth instructions for sending a message to a user indicating that one of the plurality of adapters has failed and the identity of the failed adapter.

12. The computer program product as recited in claim 11, wherein the instructions for step of sending a message comprises instructions for activating blinking lights on an expansion slot containing said failed adapter to indicate to a user which one of the plurality of adapters is the failed adapter.

13. The computer program product as recited in claim 11, wherein the instructions for sending a message comprises instructions for paging a user.

14. The computer program product as recited in claim 11, wherein the instructions for step of sending a message comprises instructions for displaying a message on a video display indicating that one of the plurality of adapters has failed and the identity of the failed adapter.

15. The computer program as recited in claim 10, further comprising:
    fourth instructions, responsive to an indication that the failed adapter has been replaced with a new adapter, for enabling the new adapter.

16. The computer program product as recited in claim 10, further comprising:
    fourth instructions for deallocating any processes bound for the failed adapter.

17. The computer program product as recited in claim 10, further comprising:
    fourth instructions, responsive to a failure to identify the failed adapter, for powering down the data processing system.

18. The computer program products as recited in claim 10, wherein the instructions for attempting to determine the identity comprises instructions for consulting an error log table.

19. A system for managing a failed adapter within a logically partitioned data processing system, the system comprising:

a plurality of adapters coupled to a bridge, said bridge coupled to and I/O bus, said plurality of adapters communicating with said I/O bus utilizing said bridge;

first means for receiving an indication that an adapter within said plurality of adapters has failed;

second means for attempting to identify the adapter as a failed adapter; and a third, responsive to successfully identifying the failed adapter, for disabling the failed adapter without powering down the data processing system, and without disabling remaining ones of said plurality of adapters, wherein said remaining ones of said adapters remain enabled, operational, and continue to communicate with said I/O bus utilizing said bridge after said failed adapter has been disabled.

20. The system as recited in claim 19, further comprising:
fourth means for sending a message to a user indicating that one of the plurality of adapters has failed and the identity of the failed adapter.

21. The system recited in claim 20, wherein the fourth means for sending a message comprises means for activating blinking lights on an expansion slot containing said failed adapter to indicate to a user which one of the plurality of adapters is the failed adapter.

22. The system as recited in claim 20, wherein the fourth means for sending a message comprises means for paging a user.

23. The system as recited in claim 20, wherein the fourth means for sending a message comprises means for displaying a message on a video display indicating that one of the plurality of adapters has failed and the identity of the failed adapter.

24. The system as recited in claim 19, further comprising:
fourth means, responsive to an indication that the failed adapter has been replaced with a new adapter, for enabling the new adapter.

25. The system as recited in claim 19, further comprising:
fourth means for deallocating any process bound for the failed adapter.

26. The system as recited in claim 19, further comprising:
fourth means, responsive to a failure to identify the failed adapter, for powering down the data processing system.

27. The system as recited in claim 19, wherein the second means for attempting to determine the identity comprises consulting an error log table.

28. A method of replacing a failed input/output adapter in a logically partitioned data processing system, the method comprising:
coupling a plurality of input/output adapters to a bridge, said bridge being coupled to and I/O bus, said plurality of adapters communicating with said I/O bus utilizing said bridge;
receiving an indication of a failed one of said plurality of input/output adapters;
consulting an error log to determine an identity of the failed one of the plurality of input/output adapters;
responsive to a lack of a determination of the identity of the failed one of said plurality of input/output adapters, shutting down the data processing system; and
responsive to determination of the identity of the failed one of said plurality of input/output adapters:
refraining form shutting down the data processing system;
disabling the failed input/output adapter without disabling remaining ones of said plurality of adapters, wherein said remaining ones of said plurality of adapters remain enabled, operational, and continue to communicate with said I/O bus utilizing said bridge after said failed input/output adapter has been disabled;
deallocating any processes bound to the failed input/output adapter; and
indicating to a user which one of a plurality of input/output adapters is the failed input/output adapter;
wherein the failed input/output adapter may be replaced without shutting down the system.

29. The method as recited in claim 28, further comprising:
responsive to a determination that the failed input/output adapter has been replaced with a new input/output adapter, enabling the new input/output adapter.

30. A logically partitioned data processing system, comprising:
a bus system;
a plurality of adapters coupled to a bridge, said bridge being coupled to an I/O bus included in said bus systems, said plurality of adapters communicating with said I/O bus utilizing said bridge;
a memory; and
a processor unit; wherein
the processor unit executes instructions to identify one of said plurality of adapters as a failed adapter; and
responsive to successfully identifying the failed adapter, disables the failed adapter hardware device without powering down the data processing system and without disabling remaining ones of said plurality of adapters, wherein said remaining ones of said plurality of adapters remain enabled, operational, and continue to communicate with said I/O bus utilizing said bridge after failed adapter has been disabled.

31. The data processing system as recited in claim 30, further comprising:
responsive to a determination that the failed adapter has been replaced by a replacing adapter, enabling the new adapter.

32. The data processing system as recited in claim 30, wherein the instructions are in the memory.

33. The data processing system as recited in claim 30, wherein the instructions are in a chip.

34. The data processing system as recited in claim 30, wherein the instructions are in an electrically erasable and programmable read only memory.

35. The data processing system as recited in claim 30, wherein the instructions are in read only memory.

36. The data processing system as recited in claim 30, wherein the instructions are in a non-volatile random access memory.

* * * * *

UNITED STATES PATENT AND TRADEMARK OFFICE
CERTIFICATE OF CORRECTION

PATENT NO.    : 6,658,599 B1
DATED         : December 2, 2003
INVENTOR(S)   : Linam et al.

It is certified that error appears in the above-identified patent and that said Letters Patent is hereby corrected as shown below:

Column 5,
Line 11, after "I/O;" delete ".".

Column 7,
Line 23, after "coupled to" delete "and" and insert -- an --.
Line 25, after "receiving" delete "and" and insert -- an --.
Line 25, after "said" delete "a".
Lines 28 and 42, after "adapter" delete "device".

Column 8,
Line 1, after "receiving" delete "and" and insert -- an --.
Line 2, afer "plurality of adapters" delete "hardware devices".
Lines 20 and 29, after "instructions for" delete "step of".
Line 55, after "coupled to" delete "and" and insert -- an --.
Line 61, before "responsive" delete "a third" and insert -- third means --.
Line 65, after "ones of said" insert -- plurality of --.

Column 9,
Line 23, after "any" delete "process" and insert -- processes --.
Line 35, after "coupled to" delete "and" and insert -- an --.
Line 47, after "refraining" delete "form" and insert -- from --.

Column 10,
Line 19, before "said plurality" delete "systems" and insert -- system --.
Line 26, after "disables the failed adapter" delete "hardware device".

Signed and Sealed this

Twenty-fourth Day of January, 2006

JON W. DUDAS
*Director of the United States Patent and Trademark Office*